(12) United States Patent
Merkel

(10) Patent No.: US 6,394,890 B1
(45) Date of Patent: May 28, 2002

(54) DEFROSTER DEFLECTOR

(76) Inventor: John Merkel, 7605 Beech Ave., Hammond, IN (US) 46324

( * ) Notice: Subject to any disclaimer, the term of this patent is extended or adjusted under 35 U.S.C. 154(b) by 0 days.

(21) Appl. No.: 09/878,606

(22) Filed: Jun. 11, 2001

(51) Int. Cl.[7] ................................. B60S 1/54
(52) U.S. Cl. ........................ 454/127; 454/121
(58) Field of Search ............... 454/85, 93, 121, 454/127, 198

(56) References Cited

U.S. PATENT DOCUMENTS

| | | | | |
|---|---|---|---|---|
| 2,096,901 A | * | 10/1937 | Knecht | 296/96.14 |
| 2,659,942 A | * | 11/1953 | Iverson | 454/122 |
| 3,152,367 A | * | 10/1964 | Fairbanks | 454/127 |
| 3,246,923 A | | 4/1966 | Turner | |
| 3,727,973 A | | 4/1973 | Perks | |
| 4,109,562 A | * | 8/1978 | MacDonald | 454/124 |
| 4,538,852 A | | 9/1985 | Lobo et al. | |
| 5,094,497 A | | 3/1992 | Hartung et al. | |
| 6,089,971 A | * | 7/2000 | Jokela et al. | 454/127 |

FOREIGN PATENT DOCUMENTS

| | | | | |
|---|---|---|---|---|
| DE | 671957 | * | 2/1939 | 454/127 |
| GB | 25668 | * | 11/1909 | 454/198 |

* cited by examiner

*Primary Examiner*—Harold Joyce
(74) *Attorney, Agent, or Firm*—Henderson & Sturm LLP

(57) ABSTRACT

A defroster deflector formed of an elongated flexible channel attached to the interior surface of a vehicle windshield near its upper edge. The channel is an inverted U-shape with an outer wall, a top wall, and an inner wall. The outer wall includes an adhesive surface with a peel-away cover that is removed immediately before the channel is placed into contact with and secured to the windshield. The channel is formed of a flexible material such as neoprene, polyurethane, or rubber that can flex and stretch while retaining its original U-shape.

7 Claims, 1 Drawing Sheet

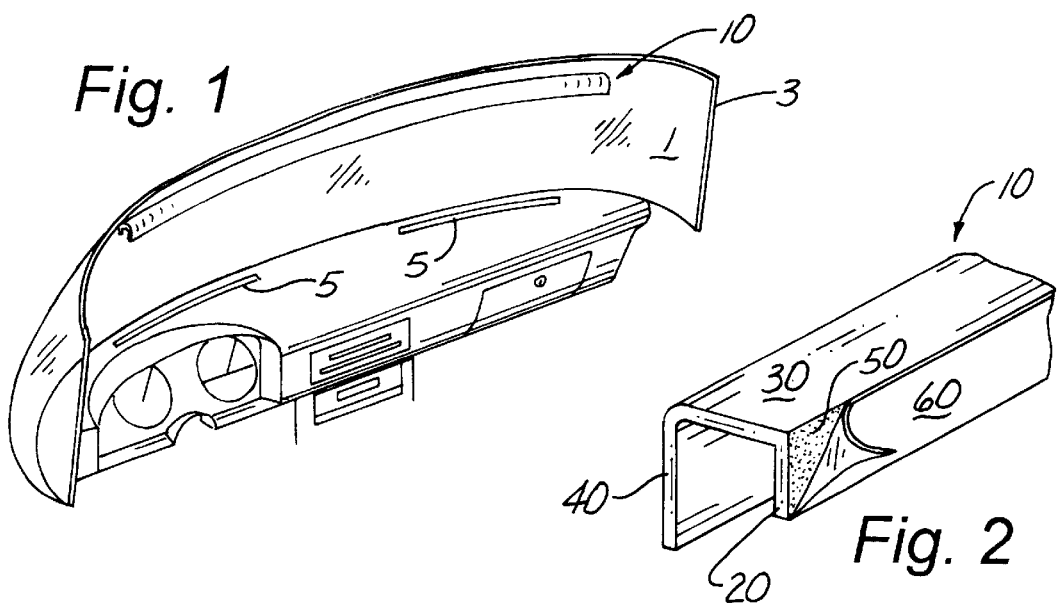
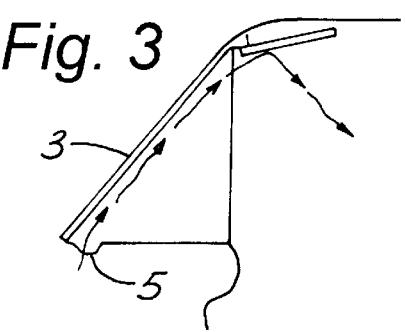
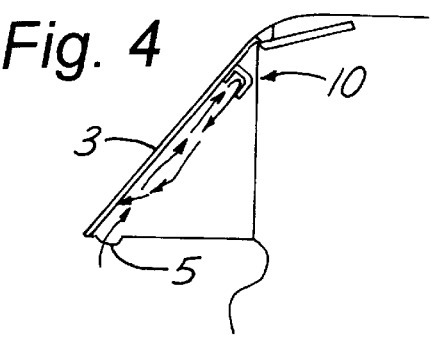
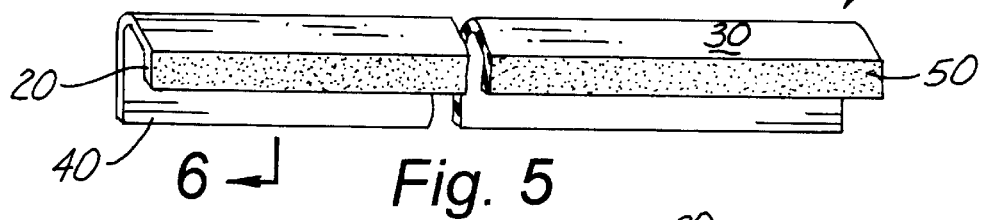
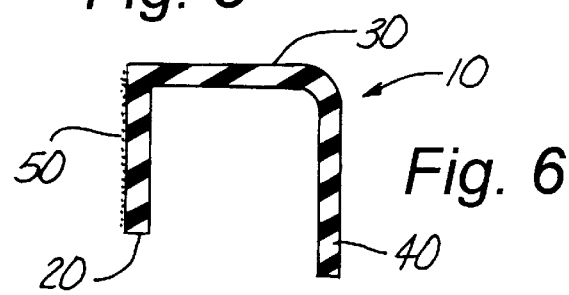

DEFROSTER DEFLECTOR

While all of the aforementioned prior art constructions are more than adequate for the basic purpose and function for which they have been specifically designed, they are uniformly deficient with respect to their failure to provide a simple, efficient and practical defroster deflector for a vehicle windshield.

As a consequence of the foregoing situation, there has existed a longstanding need for a new and improved defroster deflector and the provision of such a construction is a stated objective of the present invention.

BRIEF SUMMARY OF THE INVENTION

Briefly stated, the present invention provides a defroster deflector formed of an elongated flexible channel attached to the interior surface of a vehicle windshield near its upper edge. The channel is an inverted U-shape with an outer wall, a top wall, and an inner wall. The outer wall includes an adhesive surface with a peel-away cover that is removed immediately before the channel is placed into contact with and secured to the windshield. The channel is formed of a flexible material such as neoprene, polyurethane, or rubber that can flex and stretch while retaining its original U-shape.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a partial perspective view illustrating the defroster deflector of the present invention attached to the interior surface of a vehicle windshield near its upper edge;

FIG. 2 is an enlarged partial perspective view of the channel showing the peel-away cover overlying the adhesive surface of the outer wall;

FIG. 3 is a schematic view illustrating the normal air flow pattern from a vehicle defroster;

FIG. 4 is a schematic view illustrating the air flow pattern when the defroster deflector of the present invention is secured to the interior surface of the windshield;

FIG. 5 is a foreshortened perspective view of the deflector; and

FIG. 6 is a section view taken along line 6—6 of FIG. 5.

DETAILED DESCRIPTION OF THE INVENTION

As can be seen by reference to the drawings, and in particularly to FIG. 1, the defroster deflector that forms the basis of the present invention is designated generally by the reference number 10. The deflector 10 is a flexible, elongated inverted U-shaped channel having an outer wall 20, a top wall 30, and an inner wall 40. The outer wall 20 includes an adhesive surface 50 with a peel-away cover 60. The deflector 10 is formed of a flexible material, such as neoprene, polyurethane and rubber that can flex to a three-inch camber and stretch while maintaining its original U-shape. The adhesive used on the adhesive surface is one that will adhere to glass and be able to stand up to direct sunlight. The deflector 10 in its preferred embodiment is about four feet long and the outer wall 20 is about one inch wide, while the top wall 30 and inner wall 40 are about one and one quarter (1 ¼) inch wide. It may be made of a colored material that matches or complements the vehicle interior.

In use, the deflector 10 is simply secured to the interior surface 1 of a vehicle windshield 3 near its upper edge. The peel-away cover 60 is removed immediately before the adhesive surface 50 is brought into contact with the windshield's interior surface 1. Warm air flowing up from the defroster vents 5 flows up over the interior surface 1 and is deflected back down over the interior surface 1 as illustrated in FIG. 4. This keeps the warm dry air around the dashboard area, helping it to defrost the windshield 3 faster and blocking the air from hitting the driver and passenger in the head and eyes.

The deflector 10 is effective in controlling the air flow from the defroster of any car, truck or sport utility vehicle, foreign or domestic. The deflector 10 is further beneficial in that it eliminates the need to use the sun visor to block the draft from the defroster, since the visor obstructs the vision of the driver.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A defroster deflector in combination with a vehicle having a windshield with an interior surface, an upper and lower edge, and a defroster vent disposed adjacent the lower edge of the windshield to direct a stream of warm air upwardly over the interior surface of the windshield toward the upper edge of the windshield, the deflector comprising:

an elongated, inverted U-shaped channel having an outer wall, a top wall, and an inner wall, the outer wall including an adhesive surface disposed to contact and adhere to the interior surface of the vehicle windshield adjacent its upper edge.

2. The deflector of claim 1 wherein the channel is formed of a flexible material.

3. The deflector of claim 2 wherein the flexible material is selected from the group consisting of neoprene, polyurethane and rubber.

4. The deflector of claim 1 wherein the inner wall of the channel extends lower than the outer wall of the channel.

5. The deflector of claim 4 wherein the inner wall has a width of one and one quarter inch, the top wall has a width of one and one quarter inch, and the outer wall has a width of one inch.

6. The deflector of claim 5 wherein the channel is four feet long.

7. The deflector of claim 1 further including a peel-away cover disposed to overlie the adhesive surface of the outer wall and be removed immediately before the channel is placed in contact with the vehicle windshield.

\* \* \* \* \*